United States Patent [19]

Conner et al.

[11] Patent Number: 5,132,828
[45] Date of Patent: Jul. 21, 1992

[54] ANALOG VIDEO FIBER OPTIC LINK

[75] Inventors: David E. Conner, Cary; Alexander G. MacInnis, Chapel Hill, both of N.C.

[73] Assignee: International Business Machines Corporation, Armonk, N.Y.

[21] Appl. No.: 754,364

[22] Filed: Aug. 29, 1991

Related U.S. Application Data

[63] Continuation-in-part of Ser. No. 361,157, Jun. 5, 1989, abandoned.

[51] Int. Cl.$^5$ .............................. H04B 10/12
[52] U.S. Cl. .................... 359/173; 358/176
[58] Field of Search .............. 359/158, 161, 173; 358/176-178

[56] References Cited

U.S. PATENT DOCUMENTS

| | | | |
|---|---|---|---|
| 3,192,390 | 6/1965 | Ressler | 358/174 |
| 3,198,882 | 8/1965 | Sennhenn | 358/174 |
| 4,658,297 | 4/1987 | Nomura et al. | 358/174 |
| 4,742,575 | 5/1988 | Arita et al. | 455/617 |
| 4,863,233 | 9/1989 | Nienaber et al. | 455/617 |
| 4,883,991 | 11/1989 | Kröner et al. | 358/174 |

FOREIGN PATENT DOCUMENTS

0188285  10/1984  Japan .................... 358/174

*Primary Examiner*—Edward L. Coles, Sr.
*Assistant Examiner*—Kinfe-Michael Negash
*Attorney, Agent, or Firm*—Joscelyn G. Cockburn

[57] ABSTRACT

Described is an electro/optical system for transmitting video information. The system includes a transmitter assembly interconnected via a fiber optic assembly to a receiver assembly. The transmitter assembly includes a circuit arrangement which generates a data stream of analog signals interspersed with control pulses. The data stream is transmitted through the fiber optic assembly. Changes in the control pulses are detected at the receiver and are used to adjust the gain of a video amplifier.

16 Claims, 7 Drawing Sheets

ANALOG VIDEO FIBER OPTIC LINK

This is a continuation-in-part of copending application(s) Ser. No. 07/361,157 filed on Jun. 5, 1989 now abandoned.

BACKGROUND OF THE INVENTION

1. Field of the Invention

The present invention relates to communications systems in general and more particularly to electro/optical communications systems wherein the receiver restores transmitted signals to the condition they were in at transmission.

2. Prior Art

Optical communications systems that transmit digital and analog signals are well known in the prior art. A typical communications system includes a transmitter with an optical source such as, for example, a light-emitting diode for converting an electrical input signal to an optical signal. An optical fiber transmits the optical signal to a receiver. An optical photodetector converts the optical signal back to an electrical signal. The electrical signal is amplified by a circuit arrangement and is given to a utilization device. The systems are attractive because their radiation is in acceptable range even when information (data) with large bandwidth are transmitted.

One of the problems that is associated with optical communications systems is that the transmitted signal is subjected to much more distortion than a similar transmitted via a conventional copper wire communications channel. It is believed that the distortion is caused by the characteristics of the optical components. The components usually include transmitting diodes, light receiving photodetectors, optical connectors, optical fibers, etc. As these components age, their characteristics change and contribute to the non-linearity problem.

Another problem that is common in optical channels is that the gain is non-uniform. Non-uniform channel gain is particularly harmful to video channels which transmit information that is subsequently displayed on a monitor or cathode ray tube (CRT). In the case of monochromatic systems, only one channel is used to transmit the video data. Usually, for each transmission burst or interval a line of data is transmitted. The quality of the displayed data is a function of the channel gain. Therefore, for good quality display it is desirable to maintain a constant channel gain.

The problem is even more severe with color transmission. Unlike monochromatic systems that require a single optical channel, color systems require three channels to transmit the red, green and blue colors required for color display. Therefore, with color transmission it is desirable that the gain be maintained at a uniform level across the channels.

The prior art has used two approaches to address the signal distortion and non-uniform gain problems. In one approach the prior art seeks to improve the operating characteristics of individual components used in the optical channel. It is believed that if these characteristics are improved, the proclivity of the optical channel to distort the optical signal will also be reduced. More particularly, the light-emitting diodes and the light-receiving photodetectors are perceived as potential problem components and circuits are provided to compensate accordingly.

One noted problem with these diodes and/or photodetectors is that these devices change their operating characteristics as the junction temperature changes. Usually, the junction temperature is a function of the modulating signal. Stated another way, the junction temperature differs according to whether the modulating signal is at low or high frequency. U.S. Pat. No. 4,443,890 describes a direct-light modulation information transmission system wherein filtering means are provided at the emission side and the reception side for compensating for non-linear thermal effects of the emission means and the linear thermal effects of the reception means. In the patent the emission means is a light-emitting diode (LED) and the reception means is a photodiode.

U.S. Pat. No. 4,654,891 is another prior art patent which addresses variations, due to temperature, in the characteristics of the optical emitter and receiver. In particular, the subject patent describes a video transmission system in which a pre-distortion circuitry is provided at the transmitter. The circuit dynamically modifies the signal level with respect to which the video signal is clamped. An automatic gain control (AGC) circuitry, at the receiver, detects a DC level in the received video signal. A shift in the DC reference level of the received video signal causes the AGC circuitry to correct the receiver gain.

Even though the above prior art devices work well for their intended purposes, it should be noted that the problems which are associated with the optical channel are caused by the different components which are used in the channel. Thus, by correcting problems associated with only one of the problem sources would not necessarily correct the problem associated with the entire optical channel. To correct the problem which affects the entire optical channel requires a more comprehensive approach.

U.S. Pat. No. 4,742,575 to Arita et al is an example of prior art patents in which a comprehensive approach is used to correct problems in the optical channel. The patent describes a light signal transmission/reception system with a means which superimposes predetermined different levels reference pulse signals on the informational signals. The receiver is provided with a means for deriving the amount of change in the reference pulse signals. The derived change is used to compensate the magnitude of the received signal. The reference pulse signals are then filtered from the informational signals.

U.S. Pat. No. 4,249,264, Crochet et al, is another patent in which a low frequency reference signal is superimposed on an informational signal at the transmitter. At the receiver, the received signal is passed through a high pass filter which delivers the useful signal to a utilization device and to a low-pass filter which extracts the reference signal. The reference signal is compared with a predetermined voltage and an error signal is generated which is used for polarizing or biasing the reception diode.

There are certain applications in which the Arita et al and Crochet et al patents are not suitable for use. In particular, these references raise several additional problems if used in video transmission systems. As video transmission systems exist today, there are no practical low frequency reference signals which can be superimposed without disturbing the video signal which is displayed. With regard to the Arita et al patent, another problem is that the range (high and low) of the reference signals must be sufficiently different from the information signal so that the reference signals can be detected at the receiver. This suggests an unnecessary wide bandwidth whose upper limit can only be used to transmit reference signals as opposed to informational signals.

SUMMARY OF THE INVENTION

It is, therefore, the main object of the present invention to provide an optical communications channel which is free from the above-described problems.

It is another object of the present invention to provide an optical channel which is ideal for transmitting video signals.

These and other objects of the present invention are achieved by generating and inserting "Reference White Level" pulses in a data stream during time periods when the informational contents of the data stream are absent. This creates a hybrid data stream in which the signals representative of useful data are displaced laterally from the "Reference White Level" pulses. The hybrid data stream is transmitted through the optical channel to the receiver. A control signal which indicates the absence of data in the hybrid data stream is also transmitted to the receiver. At the receiver, the presence of the control signal indicates a time period when there is no informational data in the received signal. The changes which the reference pulses undergo as they are transmitted through the optical channel are measured, during this time period, and generate error signals which are used to adjust the gain of the receiving amplifier. During the adjustment period the output of the amplifier is not available for use.

Because of the nature of video signals, our invention is ideal for use in a video channel. Video signals have regularly recurring blanking intervals with associated synchronizing (sync) pulses. The "Reference White Level" pulses are inserted at predetermined times relative to the sync pulses. Since the "Reference White Level" pulses are occurring at known times, they are extracted at the receiver without adversely affecting the video signal that is displayed on the monitor. Changes in the pulses are determined and are used to adjust the gain of the receiving video amplifier. During the adjustment period the input of the display monitor is tied to the blanking level which is already available in video signals. Following the adjustment period, the input of the display monitor is switched to display incoming video information. In addition, the present invention provides appropriate circuit arrangements which generate the above described hybrid and control signals.

The following and other features and advantages of the present invention will be more fully described in the accompanying drawings.

DETAILED DESCRIPTION OF THE PREFERRED EMBODIMENT

The present invention may be used in any communications channel in which analog signals are to be transmitted. It works well in a communications channel in which video information is being transmitted. As such, it will be described in that environment. However, this should not be construed as a limitation on the scope of the present invention since it is well within the skill of one skilled in the art to adapt the teachings of the present invention to cover other types of analog channels.

Figure 1:
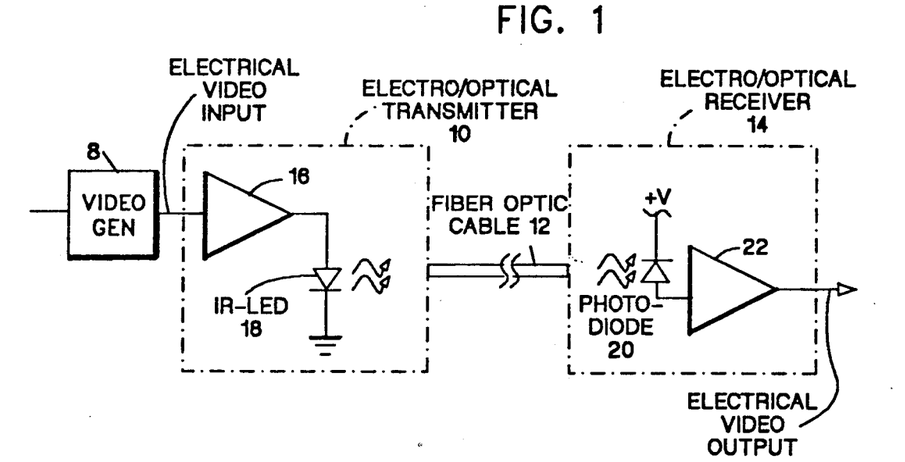
FIG. 1 is a system diagram of an electro/optical signal transmission device.

FIG. 1 shows a system block diagram of the video communications channel according to the teaching of the present invention. The video communications channel includes a video generator 8, electro/optical transmitter 10, fiber optic cable 12 and electro/optical receiver 14. The electrical video generator can be an off-shelf conventional generator such as the one called "A Triple 4-Bit D/A Converter" (P/N AD9702) by Analog Devices, Inc. A description of the generator or module is set forth at page 2-391 of the Data Conversion Products Data Book 1989/90. In addition, a subsystem which generates video for a display apparatus is set forth in "Computer Data Display" by Samuel Davis, Prentice-Hall, Englewood Cliffs, N.J., 1969 (pages 170-171). Another subsystem which generates video for a display is set forth in the section entitled "Video Subsystem", of the "IBM Personal System/2 Hardware Interface Technical Reference (68X2330)". The INMOS module P. N. IMS-G171 is used in the IBM subsystem. The named prior art references are herein incorporated. Such generators are well known in the prior art; therefore, further description will not be given. Suffice it to say that the video generator generates an electrical video input signal which is fed into the electro/optical transmitter 10. The electro/optical transmitter 10 includes control electronics 16 and infrared (IR) light emitting diode (LED) 18. Likewise, the electro/optical receiver 14 includes photodiode 20 and receiver control electronics 22. As will be explained subsequently, the transmitter control electronics 16 accepts the electrical video input signal and generates a hybrid signal (to be described hereinafter) which is used to modulate the IR-LED to output a light signal representative of the hybrid signal. The modulated light signal is conveyed by optical fiber 12 to the electro/optical receiver 14. The photodiode 20 converts the light signals into electrical signals which are processed by receiver control electronic 22 to output an electrical video signal which is used to display information on a CRT or similar display tube (not shown).

Figure 2:
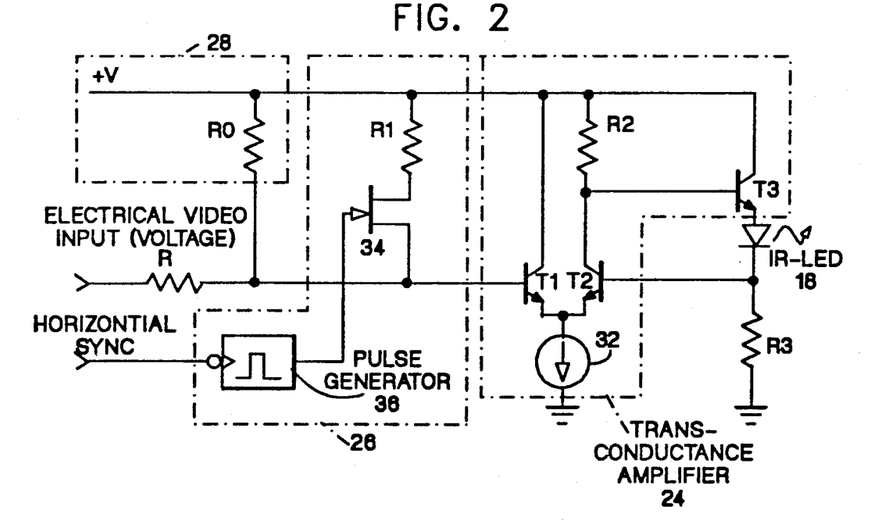
FIG. 2 is a circuit diagram of a voltage mode video generator.

FIG. 2 shows a circuit arrangement for transmitter 10. The circuit arrangement is for a voltage mode video input signal. A circuit arrangement for a current mode video source input signal will be described hereinafter. The transmitter includes IR-LED 18, transconductance amplifier 24, white reference pulse generator 26 and IR-LED bias circuit 28. The cathode or IR-LED 18 is connected to reference ground potential by resistor R3. The transconductance amplifier 24 accepts a voltage signal at its input and generates at its output a current signal representative of the input voltage signal. The current signal which is outputted from the transconductance amplifier 24 modulates IR-LED 18. The transconductance amplifier 24 further includes transistor T1, T2 and T3. The emitters of transistors T1 and T2 are connected through current source 32 to ground potential. The base of transistor T2 is connected to the cathode of IR-LED 18. The emitter of transistor T3 is connected to the anode of IR-LED 18. The base of transistor T3 is connected to the collector of transistor T2. The collector of transistor T2 is connected through R2 to the collector of transistor T3 and to +V supply. Similarly, the collector of T1 is coupled to +V voltage supply and the base of T1 is connected to the Reference White Pulse circuit generator 26.

The function of the Reference White Pulse circuit generator 26 is to generate a Reference White Pulse (details to be given hereinafter) which is inserted into the video data stream during the blanking period when no video information is displayed on the video screen. As will be explained subsequently, this blanking period is usually used as a flyback period when the beam retraces on the video display. Also, its presence is usually marked by the advent of the conventional horizontal sync pulse. The Reference White Pulse circuit generator 26 includes FET device 34 and pulse generator 36. Pulse generator 36 is a conventional off-the-shelf device which is activated by the presence of the horizontal sync pulse on its input. The output of pulse generator 36 is connected to the control electrode of FET 34. One of the terminals of FET 34 is connected to the base of T1 and another terminal is connected through resistor R1 to +V voltage supply.

The biasing current for the IR-LED 18 is provided by resistor R0. Resistor R interconnects the electrical video input voltage signal to the voltage transmitter circuit. As stated earlier, the video generator which generates the electrical video input voltage signal is conventional and the details will not be given.

Figure 3:
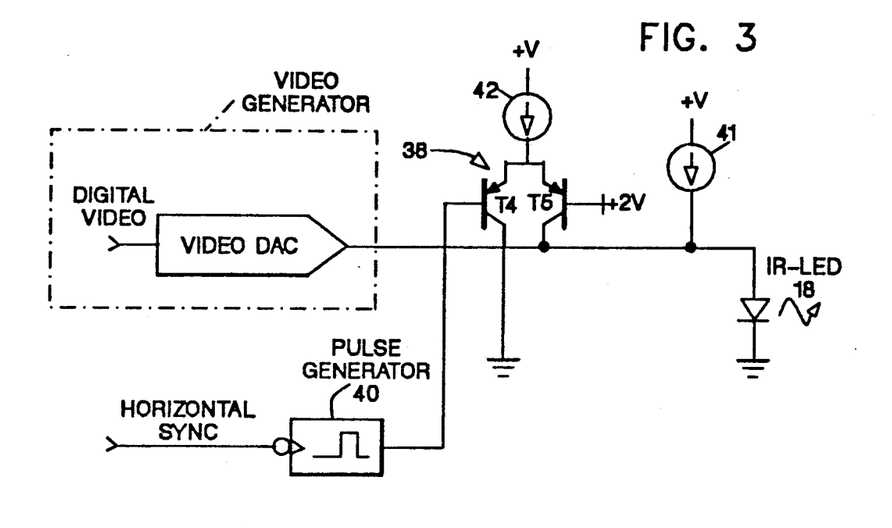
FIG. 3 is a circuit diagram of a current mode video generator.

FIG. 3 shows a circuit schematic for a current mode video generator. The circuit includes a conventional video generator including a video digital-to-analog converter (DAC). As stated previously, such a video generator is an off-the-shelf item, and details will not be given. The output of the video generator is coupled through switching assembly 38 to IR-LED 18. The switching assembly 38 includes transistor T4 and a transistor T5. The emitter electrodes of transistors T4 and T5 are connected through current source 42 to +V (voltage supply). As will be explained subsequently, current source 42 generates a pulse called "reference white pulse" which is inserted into the video signal during the blanking period. This pulse is used at the receiver to adjust the gain of the video channel. The base electrode of transistor T5 is tied to a voltage level which is approximately 2V. The collector of transistor T5 is connected to the anode of the IR-LED 18. Likewise, the base of T4 is connected to pulse generator 40. Pulse generator 40 is activated by horizontal sync pulse. When it is activated, T4 and T5 conduct and the current pulse generated by current source 42 is inserted in the video data stream and is used to modulate the IR-LED 18. When the pulse generator 40 is not activated, the video signal is used to modulate the IR-LED 18.

The biasing current which is provided by current source 41 (FIG. 3) and voltage means 28 (FIG. 2) is always present. It was determined that the IR-LED 18 has a very linear current to optical intensity transfer characteristics above a minimum current level. Therefore, current source 41 and voltage means 28 are designed to bias IR-LED 18 to operate at or above the minimum level.

Figure 4:
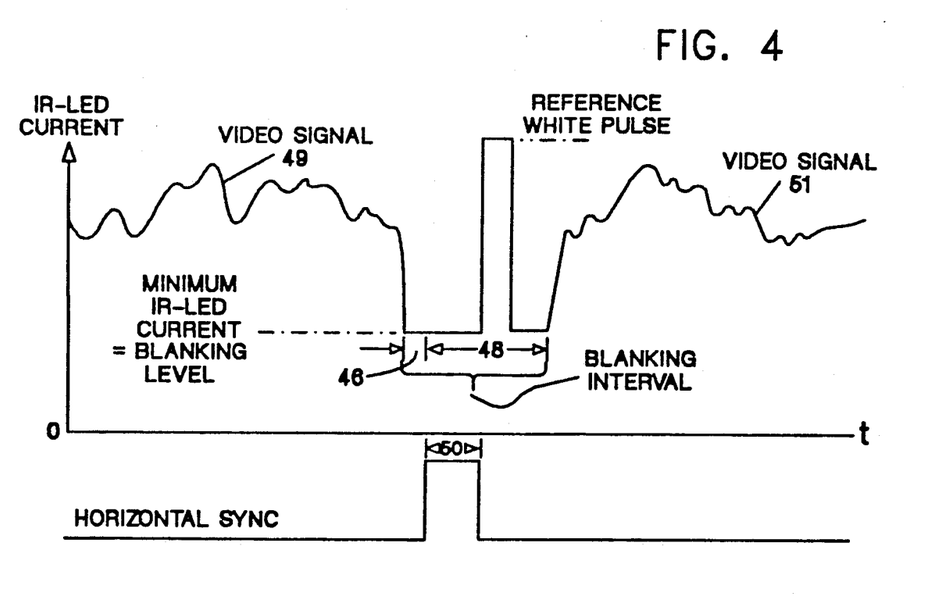
FIG. 4 shows a graphical representation of the video waveform generated by the video generator and the horizontal sync pulse.

FIG. 4 shows a graphical representation of the hybrid signal which is generated and transmitted from transmitter 10 (FIG. 1). FIG. 4 also shows the control signal which indicates the time when the Reference White Pulse is to be inserted in the data signal. In case of the video channel, the control signal is the horizontal sync pulse. Still referring to FIG. 4, the horizontal axis represents time and the vertical axis represents IR-LED current. It should be noted that the hybrid video signal which is transmitted to the fiber optical cable 12 (FIG. 1) is repetitive; therefore, only one cycle of the hybrid signal is represented in FIG. 4. As is shown in the figure, consecutive video signal bursts (such as 49 and 51) are separated by the Reference White Pulse which is inserted during the blanking interval. Preferably, the blanking level is set to be equal to the minimum IR-LED current. For purposes of discussion, the maximum blanking interval is comprised of three sections identified as horizontal front porch 46, sync period 50 and horizontal back porch 48. As can be seen from the figure, the horizontal back porch 48 is longer than horizontal front porch 46, and therefore the Reference White Pulse is best positioned within the horizontal back porch section of the blanking interval.

To better understand the structure of the hybrid video signal which is generated and transmitted according to the teachings of the present invention, a description of conventional video transmission will be given. In conventional electrical transmission of video signals on wire conductors, there is a blanking period such as the one shown in FIG. 4 during each scan line when the video level is defined to be the blanking level and black is displayed on the screen. It is during this time that the CRT's flyback occurs. This convention is retained here with a blanking level corresponding to the minimum IR-LED current level being transmitted during most of the blanking period. The Reference White Pulse, instead of the blanking level, is transmitted via the IR-LED 18 into the fiber cable 12 (FIG. 1) for a period during the blanking interval. This reference level is provided by a switched current source or an input to the controlled current source. The source of this reference pulse is keyed by the horizontal sync pulse from the video input. The reference level of the Reference White Pulse has a defined relationship to the brightest level signal available from the electrical video input. Typically, the reference level of the Reference White Pulse is a few percent brighter than the brightest video level normally available. Both the blanking level and the Reference White Level signal are used in the automatic gain control (AGC) scheme, details of which will be given hereinafter.

Referring again to FIGS. 1, 2 and 3, IR-LED 18 outputs a light signal which is conveyed by fiber optical cable 12 to the receiver 14. A low cost surface emitting IR-LED is used in this application. As stated previously, IR-LEDs have a very linear current to optical intensity transfer characteristics above a minimum current level. Therefore, the IR-LED is biased with a current source such that it is always at or above this minimum level. The video signal to be transmitted is a current source or it feeds a current controlled current source or voltage controlled current source depending on whether the electrical video signal is considered a current or voltage. As shown in FIG. 3, in some cases the video current input can be directly connected to the IR-LED along with the other current sources described here. This current source then forces a current which is proportional to the video signal amplitude into the IRD/LED. As a result, light signals representative of the video signal are conveyed by the fiber optic cable into the receiver.

Figure 5:
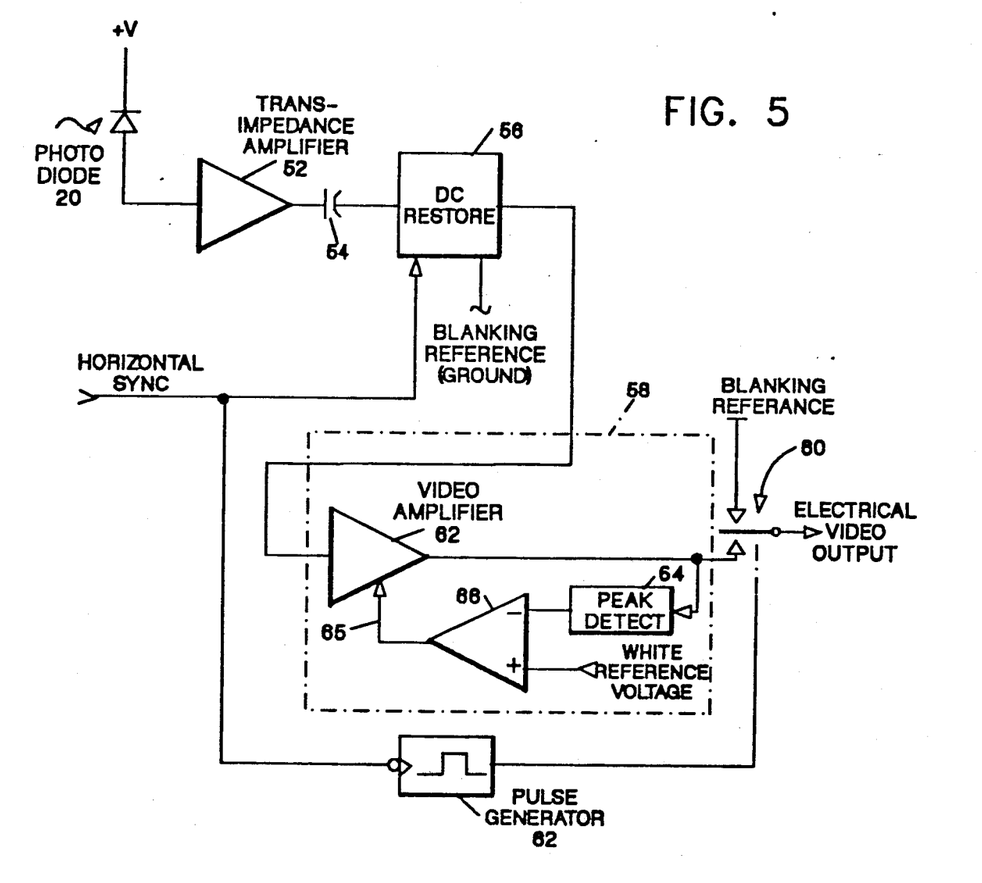
FIG. 5 shows a block diagram of the optical receiver.

FIG. 5 shows a block diagram of the receiver according to the teachings of the present invention. The primary function of the receiver is to receive optical signals from cable 12 (FIG. 1), reproduce an electrical signal that is similar to the original electrical signal that was transmitted into the optical fiber and use the reproduced electrical signal for driving a standard monitor or CRT tube (not shown). The reproduced electrical signal is identical to that which would have been carried by copper wire in a conventional video system. To this end, the receiver of FIG. 5 includes photodiode 20, trans-impedance amplifier 52, coupling capacitor 54, DC restore circuit 56, automatic gain control (AGC) circuit arrangement 58, switching assembly 60 and pulse generator 62. The AGC circuit arrangement 58 further includes video amplifier 62, peak detector 64 and comparator 66.

Still referring to FIG. 5, photodiode 20 receives the light from fiber optic cable 12 (FIG. 1) and produces an electrical current, which is amplified by trans-impedance amplifier 52 to a voltage at a useful level. At this point the signal which is referred to as "Raw Received Video", includes a linear replica of the original video signal with a DC offset and a "Reference White Pulse" during the blanking interval. The raw received video signal is AC coupled to the DC restore circuit 56 which brings the blanking level to the desired blanking level which is typically 0 volts. The DC restore circuit is activated by the horizontal sync pulse which may be transmitted via a separate electrical wire.

Next, the signal is passed through the AGC circuit arrangement 58 which corrects the amplitude of the signal so that the "Reference White Level" pulse is at the desired value. The peak detector 64 detects the amplitude of the Reference White Pulse, compares it with the desired reference level (on the conductor labeled White Reference Voltage) and generates an error signal (on conductor 65) which is used to adjust the gain of the video amplifier 62, thus forcing the "Reference White Level" pulse to be equal to the desired level. The signal which is now present at the output of AGC circuit arrangement 58 is identical to the original transmitted video signal except for the Reference White Pulse. This pulse is removed by generating a pulse from pulse generator 62 and activating switching assembly 60 so that the line marked electrical video output is connected to the blanking reference level. The DC restore circuit and the pulse generator are activated by the horizontal sync pulse.

Figure 6:
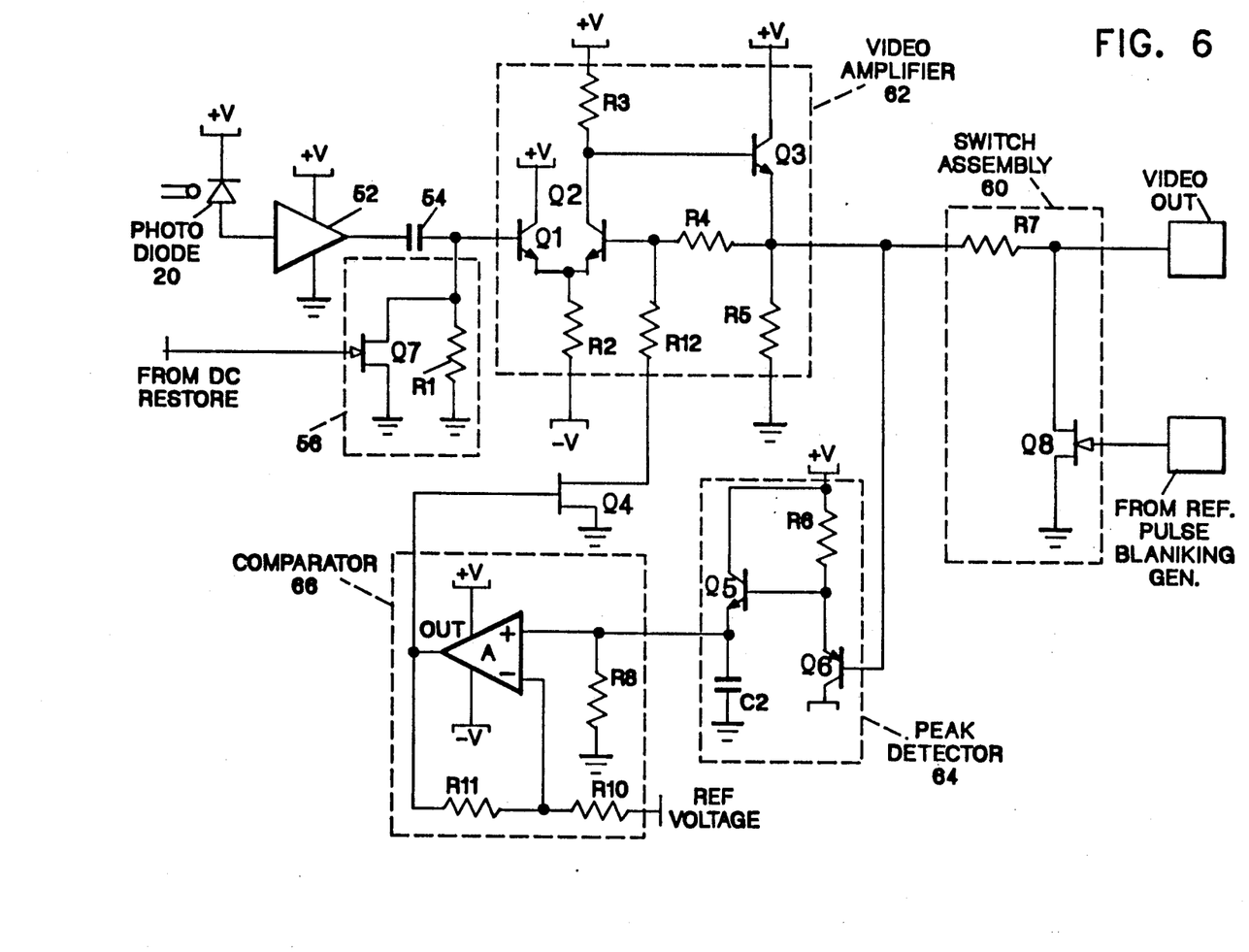
FIG. 6 shows a circuit diagram with positive peak detection for the receiver.
Figure 7:
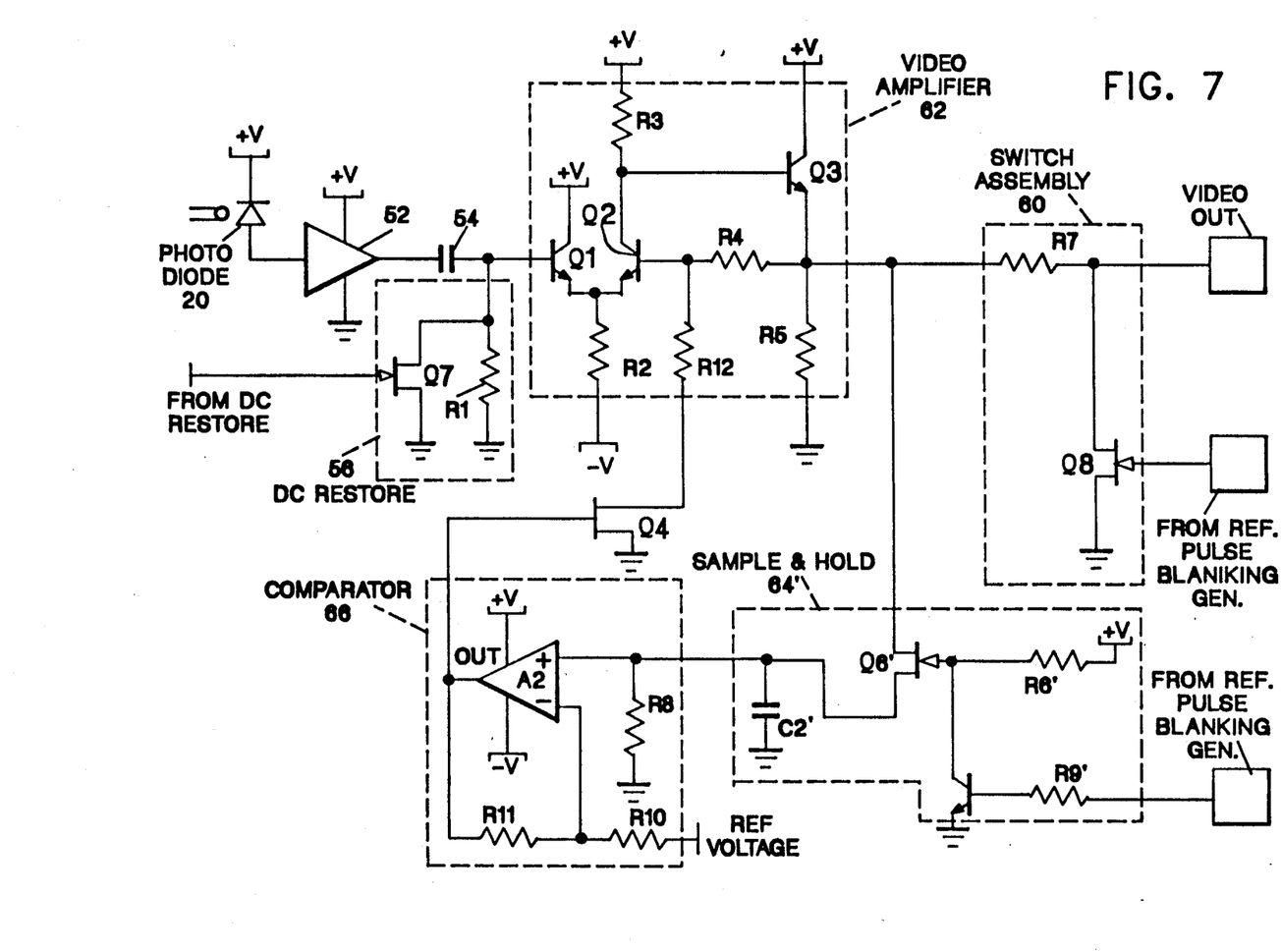
FIG. 7 shows the receiver circuit diagram with sample and hold peak detection.

FIGS. 6 and 7 show circuit diagrams for the receiver according to the teachings of the present invention. The circuit components of the figures are identical except that in FIG. 6 devices C2, Q5, Q6 and R6 form a positive peak detector whereas in FIG. 7 devices C2', Q6', R6', Q5' and R9' form a sample and hold circuit. Also, in order to correlate FIGS. 5, 6 and 7 and simplify the descriptions, common numerals are used to describe like components.

Still referring to FIGS. 5, 6 and 7, the cathode of photodiode 20 is connected to +V and the anode is connected to the input of transimpedance amplifier 52. Transimpedance amplifier 52 is a conventional off-the-shelf device and the details of the amplifier will not be given herein. Suffice it to say that the amplifier accepts a current signal and converts it to a voltage signal. The output of transimpedance amplifier 52 is connected to coupling capacitor 54. The output plate of coupling capacitor 54 is connected through FET devices Q7 and R1 to ground potential. A controlled pulse from DC restore pulse generator (to be described hereinafter) is supplied to the control electrode of device Q7. The output plate of coupling capacitor 54 is also connected to video amplifier 62.

The video amplifier is formed from transistors Q1, Q2 and Q3. The emitter of transistor Q3 is coupled through resistor R5 to ground and through R4 to the base of Q2. Likewise, the emitters of Q1 and Q2 are connected via R2 to −V supply. The collector of Q2 is connected through R3 to +V supply and the base of Q2 is connected through R12 to FET device Q4. FET device Q4 is an off-the-shelf device. In the preferred embodiment of this invention, Q4 is identified with the number 2N5019. This device is manufactured by Siliconix. Of course, there are other types of devices which could be used without departing from the scope of the present invention. The control electrode of device Q4 is coupled to comparator 66. Comparator 66 includes a differential amplifier A2 with its positive input connected to ground by R8 and its negative input connected to a voltage divider formed by resistors R10 and R11, respectively. The input to R10 is the reference voltage level which is set to be equal to the magnitude of the White Reference Pulse which is inserted at the transmitter of the present invention and was previously described.

Still referring to FIGS. 5, 6 and 7, sample and hold circuit 64' (FIG. 7) is coupled to the positive input of the differential amplifier. Alternately, peak detector 64 (FIG. 6) is coupled to the positive terminal of differential amplifier A2. As stated above, peak detector 64 is a positive peak detector which is always monitoring the output of video amplifier 62 whereas sample and hold circuit 64' samples the output of the video amplifier only when the blanking pulse from the blanking generator is present on the line labeled "From Reference Pulse Blanking Generator." With reference to FIG. 7 for the moment, the sample and hold circuit 64' is comprised of components R6' and R9', Q5', C2' and FET device Q6'. Likewise, with reference to FIG. 6, the peak detector 64 is comprised of transistors Q5, Q6, resistor R6 and capacitor C2. The switching assembly 60 comprises of resistor R7 and FET device Q8. When the blanking pulse is active on the line labeled "From Reference Pulse Blanking Generator," the line labeled Video Out is connected through FET device Q8 to the blanking reference level. In the preferred embodiment the blanking reference level is ground potential.

With reference to FIGS. 6 and 7, with no optical signal present at photodiode 20, input current of transimpedance amplifier 52 is 0. The output of amplifier 52 is at the quiescent, DC level, with no current flowing in coupling capacitor 54. The base terminals of both transistors Q1 and Q2 are at approximately ground potential. The emitter of transistor Q3 is likewise very close to ground potential. Transistors Q5 and Q6 (FIG. 6 only) form a positive peak detector circuit where the voltage across capacitor C2 is equal to the positive peak value of the signal present at base of transistor Q6 or the amplifier output.

For the no-signal condition of the amplifier previously described, the voltage across C2 is essentially 0 volts. A precision reference voltage (REF VOLTAGE) is connected through R10 and R11 to the negative terminal of differential amplifier A2. The voltage present across capacitor C2 is compared to this reference by the differential amplifier. The output of A2 is proportional to the difference between the reference voltage and the voltage across C2. The A2 output level is connected to the gate terminal of field effect transistor Q4. The drain-to-source or channel resistance of Q4 is determined by the voltage magnitude applied between the gate and source terminal. For this particular device identified by numeral 2N5019, which is fabricated by Siliconix. The channel resistance varies from a low value of 150 ohms or less with no voltage across the gate of source terminals to a value of several megohms when a voltage of 5 V is applied across the gate to source terminals. In the no-signal condition, the Q4 gate to source voltage ($V_{GS}$) is 0 or even negative, and the Q4 channel resistance is minimal. In this condition, the amplifier 62 voltage gain is determined by the expression $A_V = R4 + R12 + RQ4/R12 + RQ4$ where R4 is a resistance interconnecting the base of Q2 to the emitter of Q3, R12 is a resistor interconnecting the base of Q2, the source of Q4 and RQ4 is a channel resistor of FET Q4. Since the value of RQ4 is minimum, the amplifier voltage gain is maximum.

Still referring to FIGS. 6 and 7, when a signal is applied to photodiode 20, current is generated and flows in the input of transimpedance amplifier 52. A positive going signal will be coupled via coupling capacitor 54 to the base of Q1, and an amplified response will appear at the amplifier output. This signal is also applied to the input of peak detector circuit Q6 and Q5 (FIG. 6) or sample and hold circuit 64' (FIG. 7) where it causes C2 (FIG. 6) or C2' (FIG. 7) to charged to the most positive peak level of the input signal. This voltage level is compared to the reference voltage by differential amplifier A2, which controls the gate voltage, therefore, the channel resistance of Q4. The gain of differential amplifier A2 can be chosen such that small differences between the reference voltage and the peak detector output will significantly alter the channel resistance of Q4 and therefore the voltage gain of the video amplifier (Q1, Q2, Q3).

As stated previously, a "Reference White Pulse" is inserted at the transmitter and is transmitted during the "back porch" portion of the horizontal sync interval. This pulse is chosen to be more positive than any of the normal video signals and is identical in magnitude to that of the reference voltage. If the detected Reference White Pulse (RWP) level is less than the reference voltage, the amplifier gain is increased. A greater detected RWP level has the effect, of reducing the amplifier gain. The net result is that the detected RWP level is made to be equal to the reference voltage.

Figure 8:
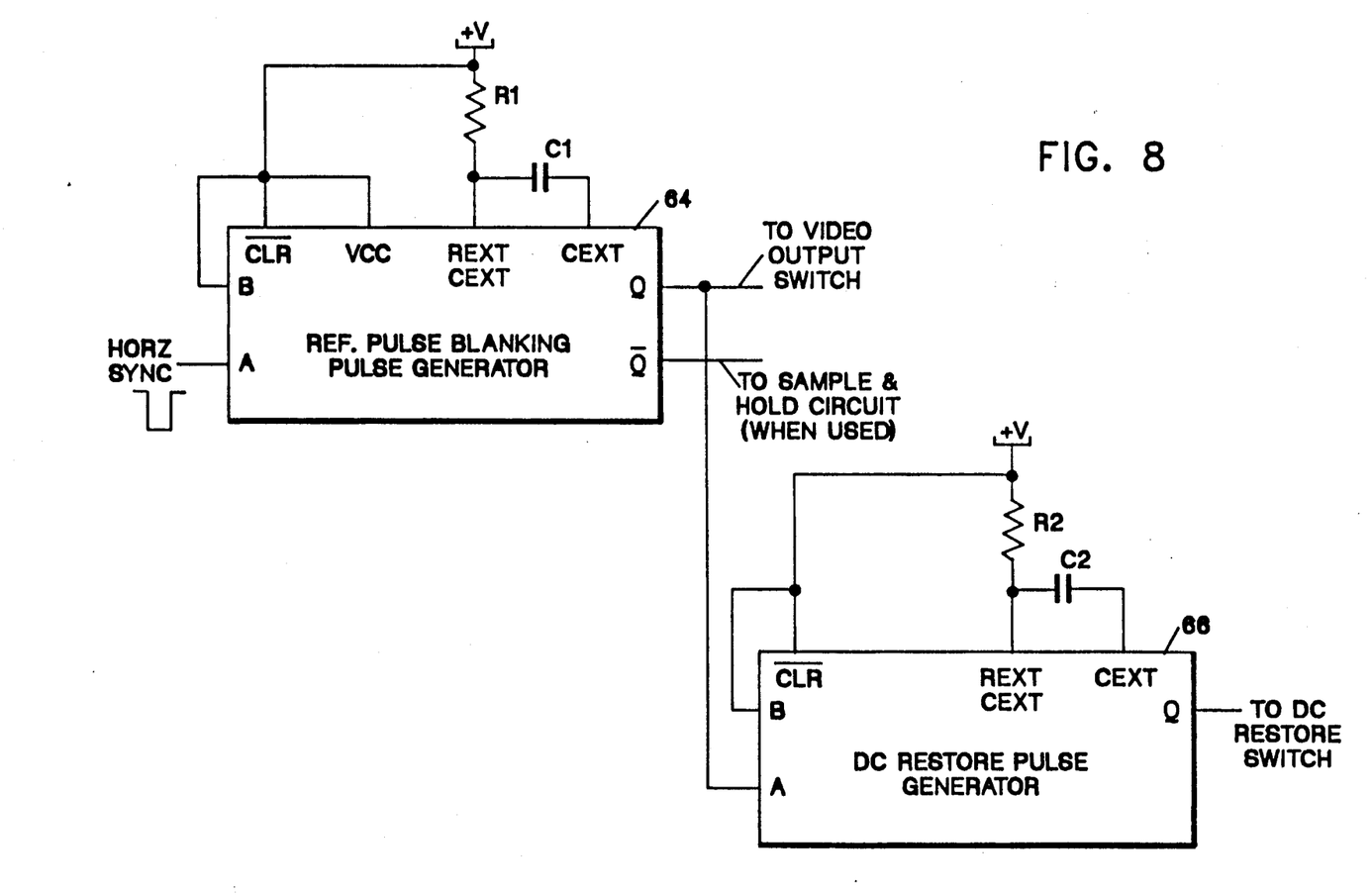
FIG. 8 shows a circuit diagram for generating timing signals that are used in the receiver.

FIG. 8 shows a circuit arrangement that generates the control pulses which activate DC restore circuit 56, sample and hold circuit 64' and switching assembly 60 (FIGS. 5, 6 and 7). The circuit arrangement includes two pulse generators 64 and 66 connected in tandem. Any conventional off-the-shelf pulse generator can be used for generating the respective pulses. In the preferred embodiment of this invention, identical conventional pulse generators, identified by numeral 74HCT221, were used. This pulse generator is fabricated by Signetics TM. Pulse generator 64 is connected through C1 and R1 to a +V supply. R1 and C1 are chosen to set the width of the pulse which is desired from the pulse generator. Likewise, R2 and C2 interconnect pulse generator 66 to a +V supply. Similarly, the values of R2 and C2 are selected to set the width of the pulse which is outputted from pulse generator 66. As stated above, for proper operation of the subject invention, the DC restoration and output video blanking must occur during the presence of the horizontal sync pulse. To this end, when the leading edge of a negative going horizontal sync pulse is applied to the "A" input of pulse generator 64, a positive going pulse begins at "Q" output, and a negative going pulse begins at the Q not output. The time duration of these pulses is solely dependent upon the values selected for R1 and C1.

The positive pulse from the Q output of pulse generator 64 is connected to the gate of field effect transistor Q8 (FIGS. 6 and 7). This pulse causes Q8 to saturate and effectively short the video output line to ground for the pulse duration. As said before, this is referred to as the blanking interval or period. During this time interval, the gain of the AGC loop is adjusted and the "Reference White Pulse" is removed from the restored video signal.

In those cases where a sample and hold circuit is used (FIG. 7), the negative going pulse from the Q not output is connected to the input side of resistor R9' (FIG. 7). This pulse causes Q5' to turn off which will cause Q6' to saturate and allow capacitor C2' to charge to the value of the output video which, at this time, should be the reference white pulse.

The input transimpedance amplifier 52 (FIGS. 6 and 7) is coupled to the video amplifier via coupling capacitor 54. The leading edge transition of the horizontal sync is used to generate a positive going pulse with a duration determined by R2 and C2 (FIG. 8). This pulse is applied to the gate of transistor switch Q7 which saturates and grounds the coupling capacitor 54. This action forces a voltage equal to the average value of the video signal across capacitor 54. Therefore, the video will begin all scan lines from ground potential, regardless of the average value of the signal.

The above description addresses a single video channel which can be used for monochromatic systems. For color systems, three identical channels transmitting Red, Green and Blue (RGB) are required. In such a configuration the transmitter side of the color system is such that for each video channel there is a separate infrared light emitting diode IR-LED which is coupled to an optical channel as shown in FIG. 1. Each LED is connected to a current source which causes a bias current to flow in the LED. This bias current is chosen such that the LED is operating in its linear region without any additional current flowing. The video current source is also attached to the LED such that the current from it also flows through the LED in an additive fashion.

Figure 9:
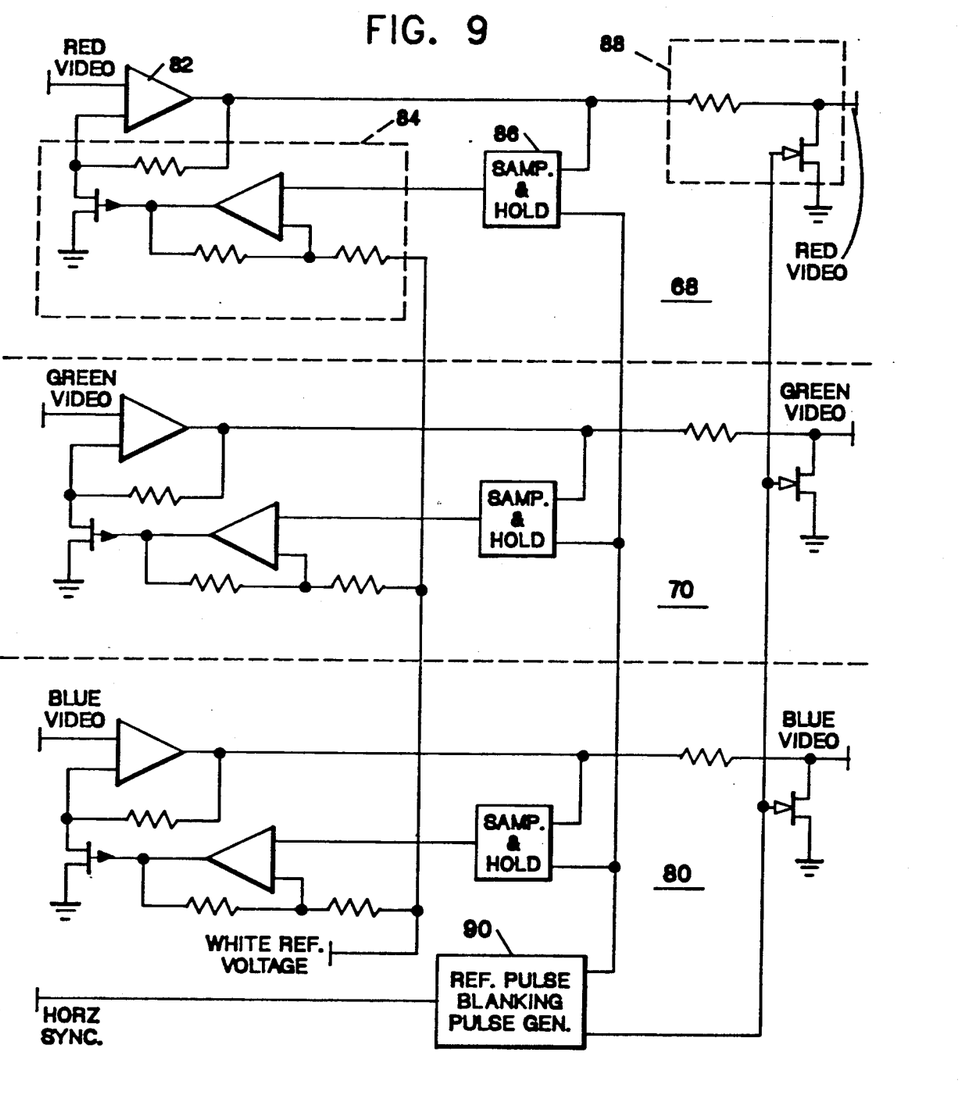
FIG. 9 shows a partial circuit arrangement for a color system.

The receiver side for such a color system is shown in FIG. 9. The Red, Green and Blue video signals are handled by video channels 68, 70 and 80, respectively. Since each of the channels 68, 70 and 80 are identical, only one will be described. Each of the channels includes a video amplifier 82, AGC circuit 84, sample and hold circuit 86, and switching arrangement 88. The control input of each sample and hold circuit 86 is connected to Reference pulse and blanking pulse generator 90. As described above, when the horizontal sync pulse is present on the line labeled horizontal sync, a pulse is generated on the output of pulse blanking pulse generator 90 which causes sample and hold circuit 86 to sample the pulse outputted from video amplifier 82. Error signals which result from a mismatch between the Reference White Voltage and the sample and hold signal create error signals which are used to adjust the gain of the video amplifier. During the time interval when the gain of the amplifier is being adjusted, the output of the line labeled Red video is connected to ground. The structure and function of video channels 70 and 80 are identical to video channel 68; therefore, a further description of those channels will not be given.

The present invention ensures that the relative amplitude of signals are maintained constant across the respective video channels. This is of maximum importance for color transmission wherein variations in the amplitude of received signals causes improper reproduction of the colors.

Although the invention has been particularly shown and described with reference to a preferred embodiment thereof, it will be understood by those skilled in the art that various changes in form and details may be made therein without departing from the spirit and scope of the invention.

Having thus described our invention, what we claim as new, and desire to secure by Letters Patent is:

1. A method for transmitting and receiving analog video information over a fiber optic link which interconnects a transmitter and a receiver with said receiver having an output node on which video information is provided, said method comprising the steps of:

at a transmitter,
  (a) generating a first stream of electrical signals representative of the video information to be displayed, said stream including time intervals, blanking period, when no video information is present in said signals;
  (b) generating Reference White Pulses;
  (c) during each blanking period, inserting a Reference White Pulse into said first stream to form a second stream of electrical signals having alternate analog and pulse electrical signals;
  (d) modulating a light source, to output light signals representative of said second stream of electrical signals;
  (e) transmitting the light signals to a receiver; at the receiver,
  (f) receiving the light signals at an input node;
  (g) detecting the light signals;
  (h) identifying the Reference White Pulses;
  (i) determining amplitude changes occurring in the Reference White Pulses;
  (j) using the changes for adjusting the gain of a video amplifier in said receiver; and
  (k) switching the output node of the receiver to connect it to a blanking reference voltage level during a time period when the gain of said video amplifier is adjusted.

2. The method of claim 1 wherein the determining step (i) further includes the steps of:
  (1) generating a third stream of electrical signals from said light signals;
  (2) establishing a reference voltage level for the White Pulse;
  (3) detecting the blanking period;
  (4) during said blanking period, comparing received reference white pulses with the referenced voltage level to generate an error signal representative of the amplitude changes within said Reference White Pulses.

3. In a light signal transmission/reception system having a transmitter for converting an electrical signal into a light signal, a fiber optic link for transmitting said light signal and a receiver for converting said light into an electrical signal, an improved signal processing system comprising:
  at the transmitter;
  a first means, provided at said transmitter, having an output for generating a stream of electrical signals characterized by alternate information periods and non-information periods;
  a second means, coupled to the first means for generating and inserting in said stream of electrical signals control pulses during the non-information period;
  third means, coupled to the second means, for converting electrical signals to optical signals;
  means, including the fiber optic link, to tranfer the optical signal from the transmitter to the receiver;
  at the receiver:
  fourth means for receiving and converting the optical signals to electrical signals;
  fifth means, coupled to the fourth means for correlating the magnitude of said control pulses with a reference magnitude of said control pulses with a reference magnitude pulse and generating therefrom, error signals representative of differences occurring between said control pulses and the reference magnitude;
  sixth means coupled to the fifth means, said sixth means responsive to the error signals for adjusting the amplitude of received signals to compensate for the changes that occurred in said control pulses; and
  seventh means for switching an output node of the receiver to a blanking reference voltage level during a blanking time interval when the amplitude of the received signals are simultaneously adjusted and the control pulses are extracted from the video output signal.

4. The light signal transmission/reception system of claim 3 wherein the second means includes an FET device (34) having a drain electrode coupled to the third means, a source electrode and a control electrode;
  a power supply for providing operating voltages;
  a resistive means (R1) interconnecting the voltage supply to the source electrode of the FET; and
  a pulse generator means having an output coupled to the control electrode of said FET and an input to receive a horizontal sync pulse.

5. The light signal transmission/reception system of claim 3 wherein the second means includes
  a current source for providing a biasing current, connected to the third means;
  a voltage supply coupled to said current source;
  a pulse generator for generating a signal on an output port when a horizontal sync pulse is present on its input port; and
  a switching means interconnecting the output port of the pulse generator and the output of the first means to the third means.

6. The light signal transmission/reception system of claim 5 wherein the switching means includes;

a first and a second transistor; said transistors being connected in a parallel configuration with the emitter electrodes of said transistors connected to a common node, a collector electrode of one of said transistors being connected to ground potential a gate electrode of said one of said transistors connected to an output of the pulse generator;

a gate electrode of another of said transistors connected to a voltage supply source and a collector electrode of said another of said transistor coupled to the third means.

7. The light signal transmission/reception system of claim 3 wherein the fifth means includes a peak detecting means for detecting the control pulses; and a comparator means for comparing magnitude of the control pulses with a reference magnitude and outputs an error signal which is a function of the difference between the peak values of the control pulses and the magnitude reference pulse.

8. The light signal transmission/reception system of claim 7 wherein the means for detecting the control pulses further includes a voltage supply;

a first transistor having a collector electrode coupled to said voltage supply;

a second transistor having an emitter electrode coupled to the base electrode of said first transistor and the voltage supply; and a capacitor for storing electrical energy interconnecting the emitter of said first transistor to a ground potential.

9. The light signal transmission/reception system of claim 7 wherein the comparator means includes:

an operational amplifier having a first input to receive the control pulses;

a voltage divider means connected to a second input of said operational amplifier; and a resistive means coupling said first input of said amplifier to ground potential.

10. The light signal transmission/reception system of claim 3 wherein the sixth means includes an amplifying means having an input for accepting the received signals and an output; and an FET device with source electrode coupled to said amplifying means and gate electrode for receiving the error signals.

11. The light signal transmission/reception system of claim 3 wherein the seventh means includes an electronic switch having one terminal coupled to the output node of the receiver and another terminal coupled to the blanking reference voltage level.

12. An improved electro/optical transmission reception system comprising:

a light-emitting diode responsive to a stream of hybrid signals to generate a light signal;

a bias circuit means, coupled to the diode, for biasing the diode so that the diode operates within a linear range;

a video circuit means for generating a video signal; said video signal having a period when video information is present and a blanking period when no video information is present;

a transmit control circuit means for generating and inserting control pulses during said blanking period wherein said video signal and said control pulses form the stream of hybrid signals;

an optical fiber assembly coupled to the light emitting diode and for transmitting said light signal;

a photodiode responsive to light outputted from the optical fiber assembly and for generating electrical signals;

video amplifier for adjusting the amplitude of the electrical signals;

a receive control circuit means, coupled to the video amplifier, to determine amplitude changes that occurs in said control pulses and generating an error signal which adjusts the gain of said video amplifier to compensate for said amplitude changes; and a switching means coupled to the output of said video amplifier; said switching means coupling the output of the video amplifier to a blanking reference voltage level during a time interval when the gain of said video amplifier is adjusted.

13. A circuit arangement for adjusting the gain across video channels of a color device comprising:

a plurality of video amplifiers, each one coupled to receive a stream of video signals representative of a primary color used in generating a color picture and to adjust the gain of signals in the stream of video signals so that gain across the video channels is uniformly adjusted;

a plurality of AGC circuit means, each one coupled to one of the plurality of video amplifiers;

said plurality of AGC circuit means generating a plurality of error signals which are used by said AGC circuit means to adjust the gain of each of the video amplifiers, with each of the error signals representative of differences between a common predetermined reference signal and a "Reference White Pulse" transmitted through each of the video channels and received by each of the plurality of video amplifiers;

a first circuit means, responsive to a horizontal sync pulse provided at its input terminal, to generate and output on a first output terminal, a first pulse which indicates a time period for sampling the "Reference White Pulse" and on a second output terminal a second pulse which indicates a blanking time period for said color device;

a plurality a second circuit means with each one having an output coupled to each one of the AGC circuit means, a first input coupled to an output of each one of the video amplifiers and a second input coupled to the first output terminal of the first circuit means; said each one of said plurality of second circuit means outputting a control pulse on the output when the "Reference White Pulse" is sensed; and a plurality of switching means, with each one having a control electrode coupled to the second output terminal of the first circuit means, a second terminal coupled to an output node of each one of the plurality of video amplifiers and a third terminal coupled to a selected voltage level;

said each one of the plurality of switching means responsive to the second pulse to connect the output node of each one of the plurality of video amplifiers to the selected voltage level when the gain of said each one of the plurality of video amplifiers is simultaneously adjusted and the "Reference White Pulse" is deleted from output video signals.

14. The circuit arrangement of claim 13 wherein the AGC circuit means includes a comparator circuit having an output terminal and a pair of input terminals with one of said pair of input terminals coupled to the second circuit means;
- a voltage divider circuit connected to another of the input terminals; and
- a variable resistive means connecting the output terminal of the comparator circuit to each one of the plurality of video amplifiers.

15. The circuit arrangement of claim 14 wherein the variable resistive means includes a resistor coupled to a video amplifier, having a fixed resistance value; and a circuit means connected in series with the resistor; said circuit means changing its resistance value according to a magnitude of the error signal applied to an input terminal of said circuit means.

16. The circuit arrangement of claim 15 wherein the circuit means includes a plurality of FET devices each one having a gate electrode to receive the error signal, a source electrode coupled to the resistor and an input of one of the video amplifiers and a second electrode coupled to a ground potential.

* * * * *